United States Patent [19]

Gerlach

[11] 4,296,323
[45] Oct. 20, 1981

[54] SECONDARY EMISSION MASS SPECTROMETER MECHANISM TO BE USED WITH OTHER INSTRUMENTATION

[75] Inventor: Robert L. Gerlach, Minnetonka, Minn.

[73] Assignee: The Perkin-Elmer Corporation, Norwalk, Conn.

[21] Appl. No.: 128,932

[22] Filed: Mar. 10, 1980

[51] Int. Cl.³ .......................................... B01D 59/44
[52] U.S. Cl. .................................. 250/289; 250/309
[58] Field of Search .............. 250/309, 305, 281, 289, 250/292, 457

[56] References Cited

U.S. PATENT DOCUMENTS

| | | | |
|---|---|---|---|
| 2,947,868 | 8/1960 | Herzog | 250/309 |
| 3,585,383 | 6/1971 | Castaing et al. | 250/309 |
| 3,930,155 | 12/1975 | Kanamata et al. | 250/309 |
| 4,058,724 | 11/1977 | McKinney et al. | 250/309 |

OTHER PUBLICATIONS

"Secondary In Quadrupole Mass Spectrometer for Depth Profilling—Design and Performance Evaluation", Magee et al., *Rev. of Sci. Instrum., 49, (4), Apr. 1978.*

"Hydrogen Ion Implantation Profiles as Determined by SIMS", Magee et al., *Nuclear Instrum. and Methods, 149, 1978.*

"The Focusing of Charged Particles by a Spherical Condenser", Purcell, *Physical Rev.,* vol. 54, Nov. 1938.
Sales Literature, "3M Brand 610 Secondary Ion Mass Spectr.", and "3M Model 620, Secondary Ion Mass Spectr.", by Chambridge Instrument Co.

*Primary Examiner*—Bruce C. Anderson
*Attorney, Agent, or Firm*—Salvatore A. Giarratana; Francis L. Masselle; Robert A. Hays

[57] ABSTRACT

There is disclosed a secondary ion mass spectrometer to be used with other spectro analysis mechanisms where the sample holder is fixed in a main vacuum chamber having a secondary vacuum chamber communicating with the main chamber with a vacuum seal between the two in which a substantially 90° spherical segment energy analyzer is disposed in the second vacuum chamber along with a quadrupole mass spectrometer and electron multiplier. A primary ion gun is disposed within the main vacuum chamber directing an ion beam at the samples to be tested and the secondary ions emitted are collected through a longitudinal extraction lens mechanism disposed between the 90° spherical segment energy analyzer and the sample to be tested in which the longitudinal extraction lens mechanism is connected to a linear movement device to focus and withdraw the extraction lens with respect to the sample to be tested and a plurality of blanking plates are disposed within the longitudinal extraction lens mechanism for deflecting certain of the secondary ions which are emitted from outside a selected area of the sample to be tested and the blanking plates are controlled through an electronic switching means that controls the blanking plates and the ion gun so that only secondary ions are emitted from the selected area of the samples being tested. The mechanism is moveable along lateral axes with respect to an axis extending through the longitudinal extraction lens and the sample to be tested.

11 Claims, 9 Drawing Figures

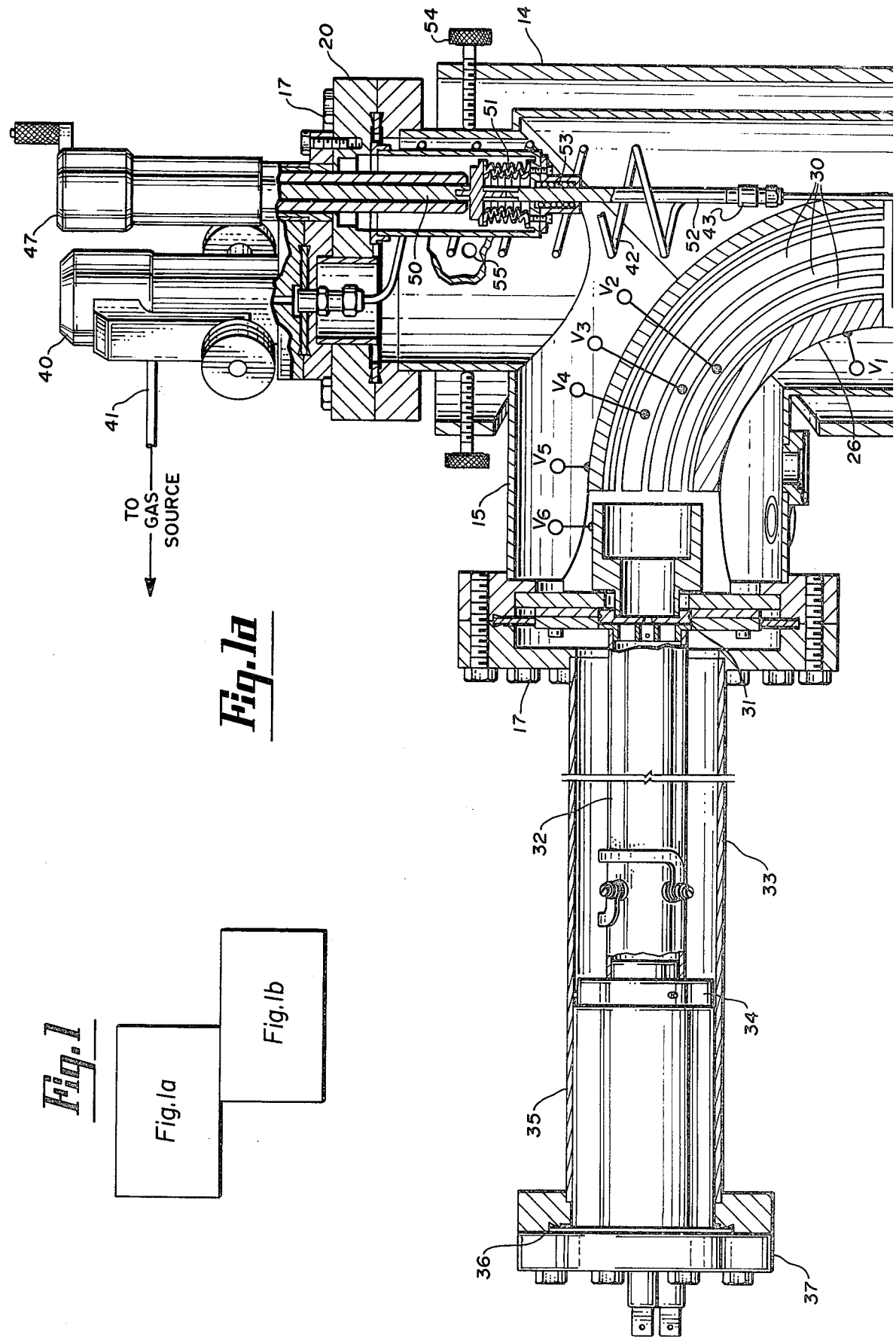

SECONDARY EMISSION MASS SPECTROMETER MECHANISM TO BE USED WITH OTHER INSTRUMENTATION

This invention relates to the field of various types of secondary emission analyzers and more particularly to a secondary ion mass spectrometer useable with other analyzers.

Definitive analyses of solid surfaces often require more than one type of instrument for such analyses such as: Auger Electron Spectroscope, and Electron Spectroscope for Chemical Analysis, Energy Dispersive X-ray Analyzers and Secondary Ion Mass Spectrometers.

A number of commercial instruments exist for analysis of the same sample by each of the above described analysis, such as those marketed by Physical Electronics Model-2500, Vacuum Generators, Riber, Cambridge Instrument Company, GmbH Atomica and Extranuclear. However, these instruments are generally lacking in the areas of sensitivity and area discrimination and flexibility. It is highly desireable to perform these various analyses on the same area of a test sample because secondary ion mass spectrometry and Auger electron spectrometry are strongly complimentary, the former being highly sensitive and detects molecular fragments, whereas the latter is more quantitative and performs an elemental analysis. Performance of multitechnique analyses have complimentry advantages because equipment can be shared such as the vacuum system, specimens stage, and sputter ion gun. The secondary ion mass spectrometer (SIMS) is a new tool for surface analysis giving the possibility of studying the chemical composition of the first molecular layer with a sensitivity that has not been reached before. It also permits the detection of chemical components and the study of isotopic composition in a depth between a few and several thousand Angströms. In carrying out such an analysis, the surface to be analyzed is bombarded with a primary ion beam to produce a secondary ion emission whose origin under optimum conditions, is the top molecular layer of the surface to be analyzed. The secondary ions coming from the surface to be tested are analyzed through the use of a sensitive quadrupole mass spectrometer coupled with an electron multiplier. The general practice has been to amount the sample to be analyzed on some form of carrousel so that it may then be moved into position for analyses through the use of one of the other instruments. However, after being bombarded, the test sample may leave the edge portions with a rounded or uneven fringe area in the first and lower molecular layers. Therefore, it is desirable to make the various tests of the same general area of the test sample and particularly it has been found beneficial to rely upon only those secondary ions released from the sample as the result of bombardment by the primary ion source at the 50% center of the surface. That is, the test sample is analyzed for what is generally the center 50% of the test sample area in both coordinates. One of the major problems in attempting to carry out such an analysis is that the sample is moved into place in front of the various pieces of analyzing equipment rather than having the test sample remain in a fixed location and then bring the various analyzers into confrontation with the test sample to be analyzed.

A typical SIMS analyzer of a non-commercial nature is described in an article by Charles W. Magee, William L. Harrington and Richard E. Honig, in Volume 49, No. 4, April 1978, Rev. Sci. Instrum., p. 477-485 entitled "Secondary Ion Quadrupole Mass Spectrometer for Depth Profiling-Design and Performance Evaluation." The analyzer described in the article makes use of a high efficiency ion extraction lens in conjunction with a 180° spherical energy analyzer and extranuclear quadrupole mass spectrometer. However, the sample to be tested is placed upon a carrousel or turret and lacks the adaptability to be combined with other equipment. For instance, the extraction lens is in very close proximity (3 mm) to the sample to be tested and can be in the way of the other analyzing equipment. All of the SIMS Optics lie inside the main vacuum chamber where there the 180° energy analyzer reflects the ions back into the quadrupole towards the sample, which is an inconvenient arrangement for compatability with other systems.

The present equipment avoids the disadvantages of the system described by Magee and permits portions of the equipment to be disposed outside the main vacuum chamber thus permitting control over the equipment which is more difficult to maintain while contained within the main vacuum chamber. Additionally, Magee speaks of using a beam rastering and signal gating system but uses the raster plates down stream from the 180° spherical electrostatic analyzer and thus the time lag and synchronization is critical when attempting to permit only the desired secondary ions to reach a quadrupole mass spectrometer. In the Magee structure, the ion counting electronics are enabled when the primary ion beam is in the so called desired area but as a practical matter, the time lag does produce synchronizing problems.

In the equipment disclosed herein blanking plates are disposed immediately after the extraction lens to deflect the secondary ions and thus stop them from passing through the optics. By using a form of "raster gating" with the blanking plates, a high quality signal is obtained from the desired area of the specimen or sample to be tested. Thus, where the prior art has the disadvantage of an appreciable delay time, usually measured in milliseconds for the ions to traverse the optics causing an out of phase gating signal, the blanking plates near the optics entrance reduce the time delay an order of magnitude.

It is thus a general object of this invention to provide a mechanism for performing a secondary ion mass spectrometry while permitting spectroanalysis in other forms without disturbing the sample to be tested.

It is still another object of this invention to provide a secondary ion mass spectrometer having a linear motion device to focus and withdraw an extraction lens with respect to a sample to be tested.

It is still another object of this invention to provide a SIMS having a longitudinal extraction lens that is moveable in two lateral directions and a longitudinal direction with respect to the sample to be tested.

It is yet a further object of the present invention to provide a SIMS having electronic means for deflecting secondary ions received from the sample being tested so that only those from a selected area of a sample reach the quadrupole mass spectrometer.

These and other objects and advantages of the invention will more fully appear from the following description made in connection with the accompanying drawings, wherein like reference characters refer to the same or similar parts throughout the several views, in which.

Figure 1B:
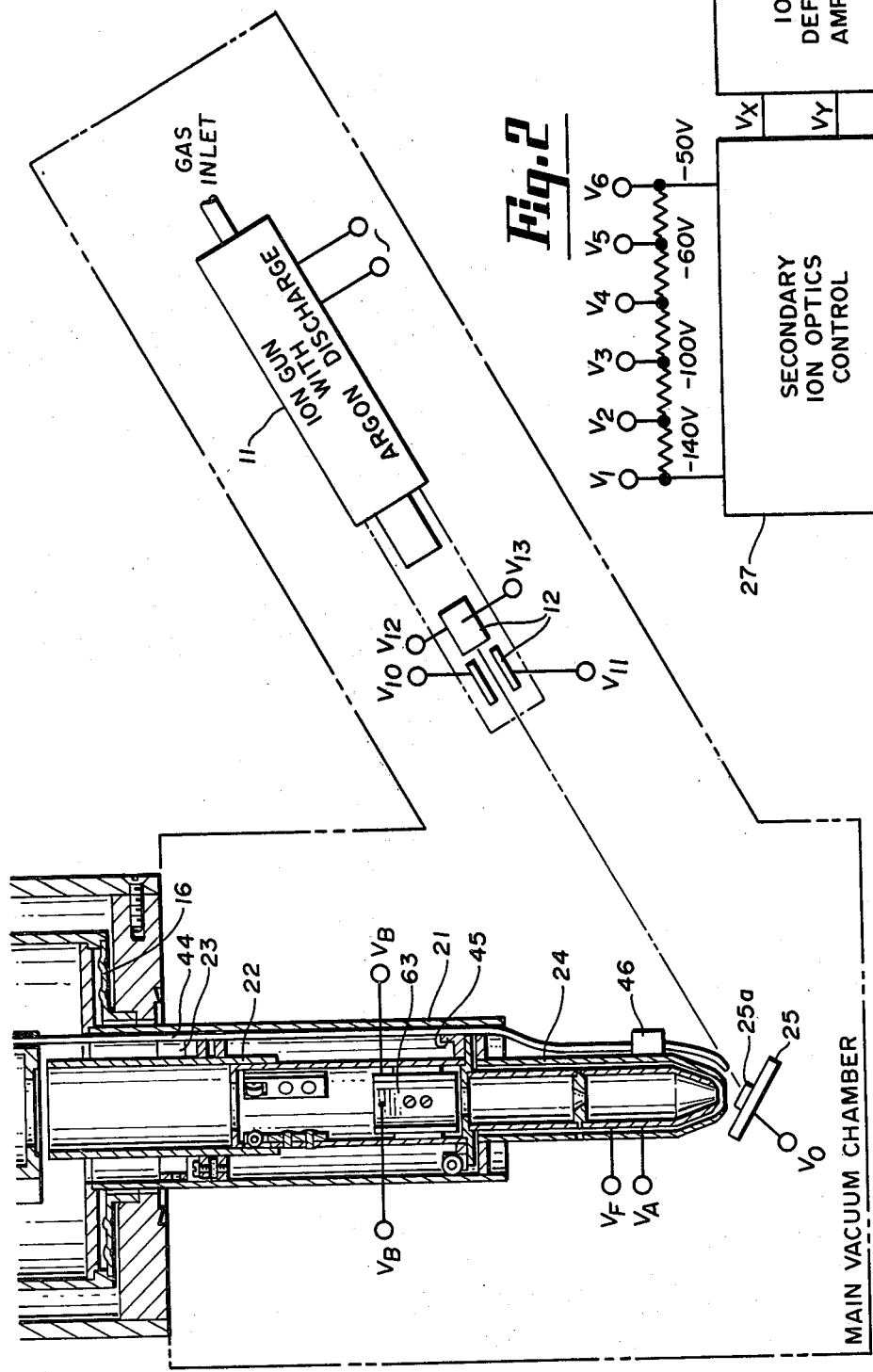
FIG. 1 is a diagramatical view, a portion of which is in section, of the secondary ion mass spectrometer.
Figure 2:
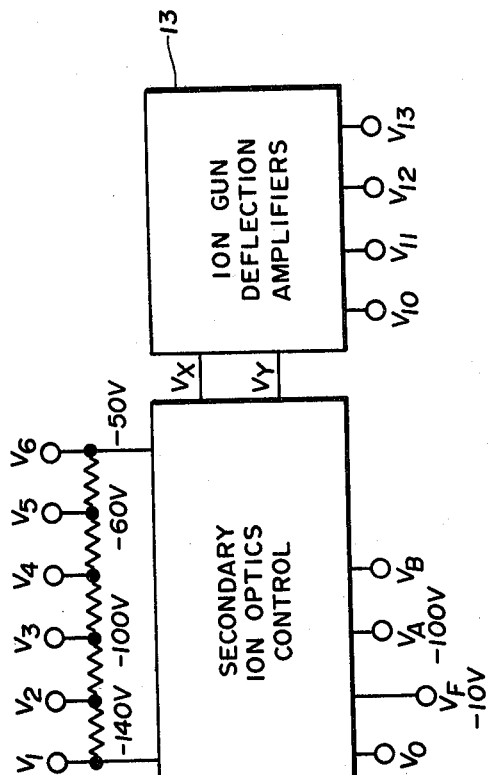
FIG. 2 is a block diagram of the electronic control circuits used with the secondary ion mass spectrometer.
Figure 5:
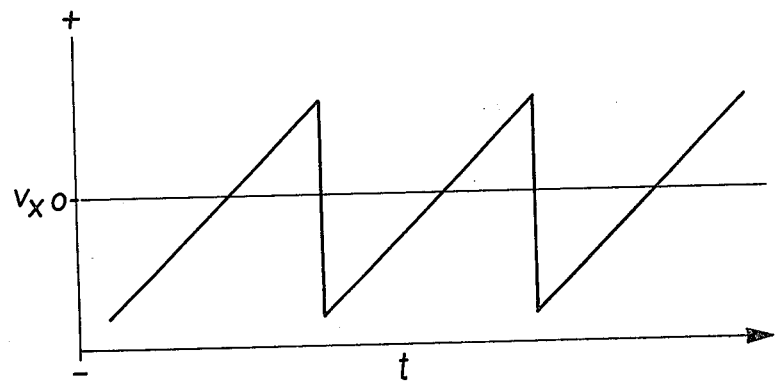
FIG. 5 is a chart of an electrical wave shape applied to the deflection plates of an ion gun.
Figure 6:
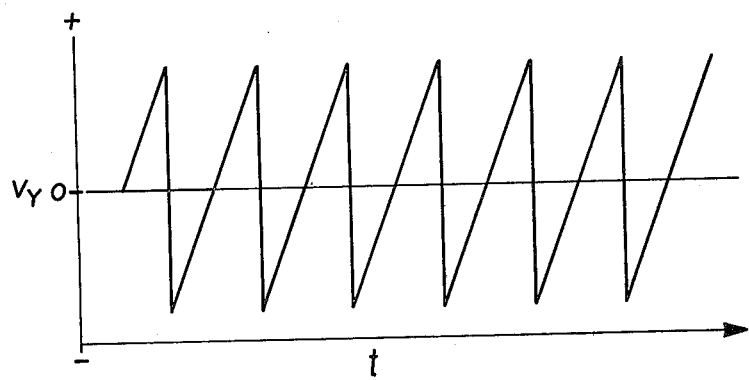
FIG. 6 is a chart of another electrical wave shape applied to the deflection plates of the ion gun.

The secondary ion mass spectrometer is shown principally in FIG. 1 in which a SIMS mechanism is disclosed. Part of the mechanism is secured within a main vacuum chamber 10 that contains an ion gun with argon discharge 11 having an argon gas inlet and an appropriate source of electrical power. The ion gun may be of the type made by Physical Electronics Industries, Inc. at 6509 Flying Cloud Dr., Eden Prairie, Minn. as Model 04-303. It should also be noted that the primary ion source may also in some cases be a primary electron beam. Ion gun 11 has 4 deflection plates 12 that have electrical signals $V_{10}$, $V_{11}$, $V_{12}$, and $V_{13}$ connected to them and those voltages are applied by ion gun deflection amplifiers 13. The saw tooth voltages which appear on the X and Y deflection plates are shown typically as the signals appearing in FIGS. 5 & 6. The electronic amplifier for the ion gun is also available as Model 11-065 from Physical Electronics Industries, Inc. of Eden Prairie, Minn.

A housing 14 is secured to main vacuum chamber 10 by bolting and sealing or other means to prevent any pressure leaks. Housing 14 is tubular in nature and has another inner housing 15 that is secured within housing 14 through the medium of a diaphragm or seal 16. Inner housing 15 has a "T" section that extends at right angles and has a flange at the end which is bolted together with suitable means such as bolts 17. The upper end of inner housing 15 is also enclosed against vacuum leaks by a flange 20 bearing against a flange of inner housing 15 and secured by suitable means such as bolts or cap screws 17.

Figure 3:
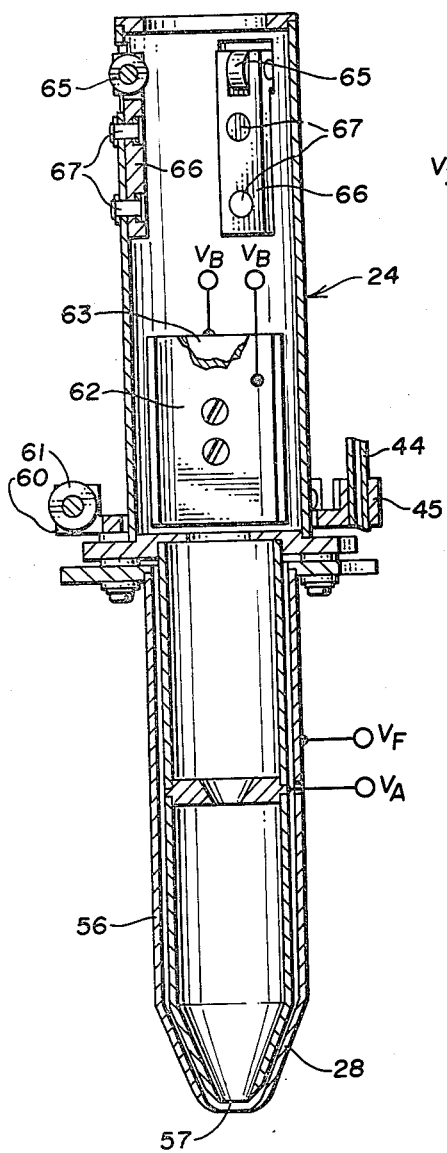
FIG. 3 is a sectional view of a longitudinal extraction lens mechanism.

Disposed at the opposite end of inner housing 15, is an outer barrel 21 that is secured to inner housing 15 by suitable means such as welding or bonding to create a mechanical connection. Outer barrel 21 is in coaxial alignment with inner housing 15 and extends through seal 16. Another tubular member 22 is secured within outer barrel 21 through the medium of a collar 23 which is secured to both members by suitable means such as machine screws. An inner barrel assembly 24 is concentrically mounted within outer barrel 21 and is shown in more detail in FIG. 3. Disposed below inner barrel assembly 24 is a sample holder 25 that has a test sample 25a secured thereto. It will be observed that the ion stream from ion gun 11 impinges upon test sample 25a at an angle of approximately 60° with a vertical axis.

Disposed above tubular member 22, is a 90° spherical segment energy analyzer 26 that is disposed within housing 15 that acts as a secondary vacuum chamber. The energy analyzer 26 focuses the ion stream between its inlet aperture and the outlet aperture and this is accomplished by establishing an electrostatic field across the energy analyzer. The spherical segment portion having the shortest radius has a negative 140 voltage $V_1$ applied thereto which is obtained from a secondary ion optics control circuit 27, the voltage appearing across a voltage divider. A plurality of fringing field plates 30 are disposed within the 90° spherical segment energy analyzer adjacent the edges thereof to aid in controlling focusing the beam of secondary ions moving through the analyzer and the plates are supplied with negative voltages of minus 120 volts, minus 100 volts, and minus 80 volts applied respectively as voltages designated $V_2$, $V_3$ and $V_4$. In other words, the voltages are graduated from the higher voltage to the lower voltage moving from the inner radius to the outer radius. The outer shell has a voltage of minus 60 volts applied and is designated as $V_5$. An additional element of the 90° spherical segment energy analyzer is connected to a minus 50 volts designated $V_6$.

Downstream from the energy analyzer is an aperture plate 31 that has an accelerator voltage $V_a$ applied thereto which is minus 100 volts. A quadrupole mass spectrometer 32 is disposed downstream from the 90° spherical segment energy analyzer 26 and is contained within a housing 33 that maintains a portion of the secondary vacuum chamber in communication with housing 15. The quadrupole mass spectrometer may be of the type manufactured by Balzers (AG) Lichenstein and is designated as an 8 mm diameter rod quadrupole mass spectrometer.

Disposed downstream from the quadrupole mass spectrometer 32, is an RF baffle 34 and downstream from RF baffle 34 is an electron multiplier 35 that may be of the type manufactured by the Bendix Corporation Model 4730 known as a continuous Dynode Multiplier. The end of housing or envelope 33 is secured by a gasket 36 over which a flange 37 is secured and held in place by suitable means such as cap screws or bolts.

Connected to flange 20 at the upper part of the mechanism is a leak valve 40 such as the one built by Varian Associates that is connected to a gas source under pressure (not shown) through a gas line 41. Gas is regulated by leak valve 40 and passes through a helical tubing 42 and is connected at its lower end to a coupling 43. The gas line continues in the form of a stiff tube 44 that extends downwardly between outer barrel 21 and tubular member 22 where it is secured by suitable means to a lug 45 that is part of inner barrel assembly 24. Inner barrel assembly 24 includes a longitudinal extraction lens mechanism 56 having an aperture 57 for admitting the secondary ions. Tube 44 continues downwardly along the outside of, but not touching extraction lens 56 and is held in place by an insulator 46 that is suitably secured to extraction lens 56. Tubing 44 terminates in a nozzle forming a gas jet having its aperture adjacent the end 28 of extraction lens 56.

Also disposed on the top flange 20, is a micrometer mechanism 47 that includes an extendable member 50 that is connected to a bellows 51 and a rod 52 that terminates in coupling 43. Thus the helical tubing 42 is concentric with rod 52 and through the manipulation of micrometer 47, rod 52 and gas tubing 44 are moveable linearly with the longitudinal axis of housing 14. A ball bushing 53 is secured in place at the bottom portion of the micrometer housing 47 to insure that rod 52 moves smoothly. Thus it will be evident that stiff tubular member 44 also serves as an extension rod 52, thus moving inner barrel assembly 24 in a longitudinal manner and in concentric alignment with the inlet aperture of 90° spherical segment energy analyzer 26.

The entire mechanism contained within secondary vacuum chamber 15 and the envelope 33 coupled therewith are made laterally adjustable about a vertical or longitudinal axis defined by housing 14. The lateral adjustment is accomplished through a pair of adjustable screws 54 that in effect tilts the end 28 of the inner barrel in one plane and a pair of adjustable screws 55 (only one of which is shown) adjusts end 28 of the inner barrel about an axis 90° from that conforming to adjustment screw 54. In other words, tip 28 of the inner barrel may be adjusted in two different directions with respect to test sample 25a.

Figure 4:
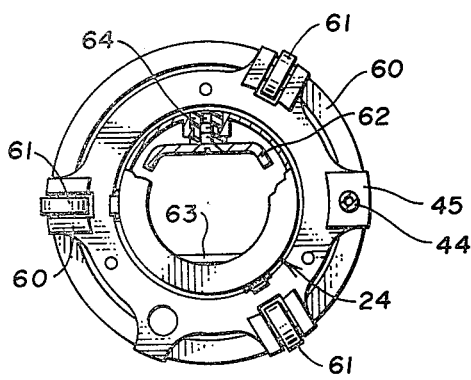
FIG. 4 is a top plan view of the longitudinal extraction lens mechanism.

Further details of the extraction lens 56 may be found in the article by Magee set forth above. The accelerator voltage $V_a$ is applied to the extraction lens 56 and is of a minus 100 volts and is supplied by the secondary ion optics control circuit 27. The inner barrel assembly 24 is also connected to a focus voltage $V_F$ having a potential of minus 10 volts. The sample or sample holder is at a 0 voltage potential and is identified as $V_0$. Extraction lens 56 and the lower end of inner barrel 24 are insulated from each other and have a supporting lug 60 that is also used to pivotally support a plurality of bearings 61 that rotate inside outer barrel 21 when inner barrel 24 and extraction lens 56 are moved vertically. Also insulated from inner barrel 24 are a pair of blanking plates 62 and 63 that deflect the secondary ions from passing through the optics when a proper blanking voltage $V_B$ is applied. An insulator 64 is shown supporting blanking plate 62 (FIG. 4). For the present mechanism, $V_A$ is an enabling negative voltage of minus 100 volts and $V_B$ the blanking voltage may be substantially half the negative voltage applied to the blanking plates. Another plurality of bearings 65 are disposed in a bearing holder 66 that are secured on the inner circumference of inner barrel assembly 24 by suitable means such as rivets 67 permitting the bearings to extend through cut-out areas in the side of barrel assembly 24. Bearings 65 ride against the inside of tubular member 22 so that barrel assembly 24 and extraction lens 56 are moved in an axial movement along the longitudinal axis formed by housing 14 and the concentric members described above.

Figure 7:
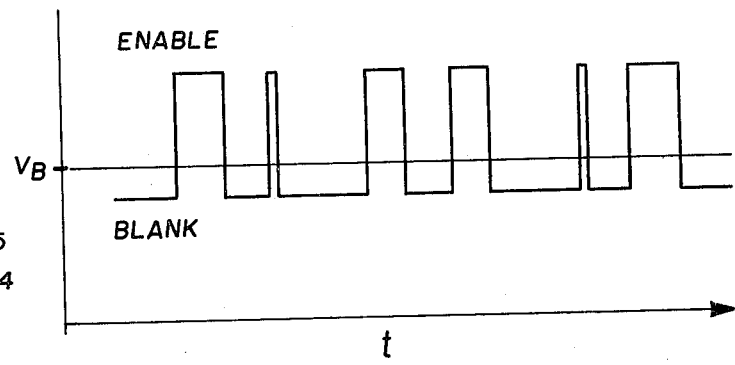
FIG. 7 is a chart of a blanking voltage wave shape applied to the blanking plates of a longitudinal extraction lens mechanism.

By adjusting micrometer 47, extraction lens 56 may be moved closer to, or away from, test sample 25a and may in fact be withdrawn into outer barrel 21 so that other forms of analyzers may be brought into close proximity to test sample 25a. To make sure that a proper reading of the secondary ions is made, a blanking voltage is applied (FIG. 7) to the blanking plates 62 and 63 whenever the scanning voltage for the two different axes of the ion gun are outside of the middle 50% of the area being tested. That area is defined by the relative magnitude of the voltages forming the scanning voltages $V_x$ and $V_Y$ that are applied to the ion gun deflection amplifiers 13 and ultimately emerge as voltages $V_{10}$, $V_{11}$, $V_{12}$, and $V_{13}$. Whenever the scanning voltages are outside of of that central area, the blanking voltage $V_B$ is applied and the ions are driven out of the normal flow path by blanking plates 62 and 63 to insure that a test sample may be analyzed without encountering problems incidental to the edge of the ion beam scan. Additionally, through the use of this technique, other analyses may be performed over the same area of the test sample.

It will, of course, be understood that various changes may be made in the form, details, arrangement and proportions of the parts without departing from the scope of the invention which consists of the matter shown and described herein and set forth in the appended claims.

What is claimed is:

1. In a high definition spectroanalysis mechanism having capabilities of performing a plurality of analysis including a secondary ion mass spectrometry analysis of a preselected surface area the mechanism comprising:
   (a) a main vacuum chamber;
   (b) a secondary vacuum chamber communicating with said main chamber;
   (c) a flexible vacuum seal member having an opening in communication with said main and secondary vacuum chambers and permitting relative movement between said two vacuum chambers;
   (d) a substantially 90° spherical segment energy analyzer disposed within said secondary vacuum chamber having an electrostatic field for conducting ions from an inlet aperture through an outlet aperture;
   (e) a quadrupole mass spectrometer disposed within said secondary vacuum chamber in operable communication with the outlet aperture of said 90° spherical segment energy analyzer;
   (f) an electron multiplier operably connected to said quadrupole mass spectrometer and disposed within said secondary vacuum chamber;
   (g) a sample holder disposed in said main vacuum chamber and adapted to secure a sample to be tested;
   (h) a primary ion gun disposed within said main vacuum chamber directing an ion beam at the sample to be tested so that the sample emits secondary ions;
   (i) a longitudinal extraction lens mechanism disposed between the sample to be tested and said substantially 90° spherical segment energy analyzer and extending between said main and secondary vacuum chambers and through said vacuum seal, said extraction lens mechanism having an aperture for admitting the secondary ions;
   (j) a linear movement device connected to said longitudinal extraction lens mechanism to focus and withdraw said extraction lens with respect to the sample to be tested;
   (k) a plurality of blanking plates disposed within said longitudinal extraction lens mechanism for deflecting certain of the secondary ions emitted from outside a selected area of the sample being tested;
   (l) and electronic switching means operably connected to said plurality of blanking plates providing electrical signals for controlling the electrical potential on said blanking plates so that only secondary ions emitted from the selected area of the sample being tested pass through said longitudinal extraction lens and reach said quadrupole mass spectrometer.

2. The structure set forth in claim 1 including:
   (m) lateral axis movement mechanism secured to said main vacuum chamber and communicating with said secondary vacuum chamber for imparting limited movement thereto that is transverse to a longitudinal axis defined by said electron multiplier and quadrupole mass spectrometer.

3. The structure set forth in claim 1 including:
   (n) a gas jet secured to said extraction lens mechanism and having its aperture adjacent the end of said extraction lens;

(o) and a gas leak valve operably connected to a source of gas under pressure and to said gas jet to control a stream of gas flowing from said gas jet aperture.

4. The structure set forth in claim 1 including:
(p) a plurality of fringing field plates disposed within said substantially 90° spherical segment energy analyzer adjacent the edges thereof to aid in controlling the focusing of the secondary ions moving through said substantially 90° spherical segment energy analyzer;
(q) and a voltage divider connected to said substantially 90° spherical segment energy analyzer and said plurality of fringing field plates to provide a voltage gradient for the same.

5. The structure set forth in claim 1 wherein said longitudinal extraction lens mechanism includes:
(r) an outer barrel secured to said main vacuum chamber in concentric alignment with the inlet aperture of said substantially 90° spherical segment energy analyzer;
(s) an inner barrel concentrically supported for linear movement within said outer barrel;
(t) and a rod mechanism secured between said linear movement device and said inner barrel providing a telescoping movement between said outer and inner barrels without rotational movement with respect to each other.

6. The structure set forth in claim 1 wherein said linear movement device includes a micrometer for moving said extraction lens mechanism to a determined position with respect to said sample holder and the sample to be tested.

7. The structure set forth in claim 1 wherein said electronic switching means provides scanning signals in two dimensions to said primary ion gun that produces ion traces across the sample to be tested in non-repeating scans and blanking signals applied to said plurality of blanking plates to divert the secondary ions from reaching said substantially 90° spherical segment analyzer.

8. The structure set for in claim 1 wherein said primary ion gun is aimed at the sample to be tested at an angle of substantially 90° with respect to the longitudinal axis of said longitudinal extraction lens mechanism.

9. In a high definition spectroanalysis mechanism having capabilities of performing a plurality of analysis including a secondary ion mass spectrometry analysis of a preselected surface area, the mechanism comprising:
(a) a main vacuum chamber having an opening therein; said main vacuum chamber having means therein for producing secondary ions from said preselected surface area;
(b) a secondary vacuum chamber communicating with said main chamber through said opening therein;
(c) a flexible vacuum seal having an opening therein, said seal communicating with said main and secondary vacuum chambers permitting relative movement between said two vacuum chambers;
(d) means for imparting a limited movement of said secondary chamber with respect to said main chamber;
(e) a longitudinal extraction lens mechanism disposed adjacent the sample to be tested and extending between said main and secondary vacuum chambers and through said vacuum seal;
(f) a linear movement device connected to said longitudinal extraction lens mechanism to focus and withdraw said extraction lens with respect to said preselected surface area to be tested; and
(g) means, within said secondary vacuum chamber, for analyzing said secondary ions from said preselected surface area.

10. The structure set forth in claim 9 wherein said means for analyzing includes;
(h) a substantially 90° spherical segment energy analyzer disposed within said secondary vacuum chamber having an electrostatic field for conducting ions from an inlet aperture through an outlet aperture;
(i) a quadrupole mass spectrometer disposed within said secondary vacuum chamber in operable communication with the outlet aperture of said 90° spherical segment energy analyzer;
(j) an electron multiplier operably connected to said quadrupole mass spectrometer and disposed within said secondary vacuum chamber;
(k) a primary ion gun disposed within said main vacuum chamber directing an ion beam at the sample to be tested so that the sample emits secondary ions, said extraction lens mechanism having an aperture for admitting the secondary ions;
(l) a plurality of blanking plates disposed within said longitudinal extraction lens mechanism for deflecting certain of the secondary ions emitted from outside a selected area of the sample being tested;
(m) and electronic switching means operably connected to said plurality of blanking plates providing electrical signals for controlling the electrical potential on said blanking plates so that only secondary ions emitted from said preselected surface area being tested pass through said longitudinal extraction lens and reach said quadrupole mass spectrometer.

11. The structure set forth in claim 9 including:
(n) a gas jet secured to said longitudinal extraction lens mechanism and having its aperture adjacent the end of said longitudinal extraction lens;
(o) and a gas leak valve operably connected to a source of gas under pressure and to said gas jet to control a stream of gas flowing from said gas jet aperture.

* * * * *

UNITED STATES PATENT AND TRADEMARK OFFICE
CERTIFICATE OF CORRECTION

PATENT NO. : 4,296,323          Page 1 of 2
DATED : October 20, 1981
INVENTOR(S) : Robert L. Gerlach It is certified that error appears in the above-identified patent and that said Letters Patent are hereby corrected as shown below:

Column 1, line 23, change "desireable" to --desirable--.

Column 1, line 30, change "complimentry" to --complimentary--.

Column 1, line 48, change "carrousel" to --carousel--.

Column 2, line 9, change "carrousel" to --carousel--.

Column 2, line 45, change "an" to --and--.

Column 3, line 1, change "diagramatical" to --diagrammatical--.

Column 7, line 43, change "for" to --forth--.

UNITED STATES PATENT AND TRADEMARK OFFICE
CERTIFICATE OF CORRECTION

PATENT NO. : 4,296,323
DATED : October 20, 1981
INVENTOR(S) : Robert L. Gerlach

It is certified that error appears in the above—identified patent and that said Letters Patent are hereby corrected as shown below:

Column 1, line 47, change "amount" to --mount--.

Column 7, line 46, change "90°" to --60°--.

Signed and Sealed this

*Twenty-first* Day of *September 1982*

[SEAL]

Attest:

GERALD J. MOSSINGHOFF

*Attesting Officer*     *Commissioner of Patents and Trademarks*